(12) United States Patent
Fisher et al.

(10) Patent No.: US 8,539,169 B1
(45) Date of Patent: Sep. 17, 2013

(54) MANAGING POWER CONSUMPTION OF A STORAGE SYSTEM

(75) Inventors: Michel Fisher, Natick, MA (US); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 451 days.

(21) Appl. No.: 11/962,802

(22) Filed: Dec. 21, 2007

(51) Int. Cl.
*G06F 12/00* (2006.01)

(52) U.S. Cl.
USPC ........... 711/154; 711/111; 711/112; 711/114; 713/300; 713/320; 713/340

(58) Field of Classification Search
USPC ................. 711/111, 112, 114, 154; 713/300, 713/320, 340
See application file for complete search history.

(56) References Cited

U.S. PATENT DOCUMENTS

| | | | | |
|---|---|---|---|---|
| 6,732,241 B2 * | 5/2004 | Riedel | | 711/154 |
| 7,265,852 B2 * | 9/2007 | Goto et al. | | 358/1.14 |
| 7,275,166 B2 * | 9/2007 | Kaiju et al. | | 713/320 |
| 7,275,170 B2 * | 9/2007 | Suzuki | | 713/340 |
| 7,278,033 B2 * | 10/2007 | Mylly | | 713/300 |
| 7,383,382 B2 * | 6/2008 | Powell et al. | | 711/114 |
| 7,407,108 B1 * | 8/2008 | Euler et al. | | 235/472.01 |
| 7,444,483 B2 * | 10/2008 | Taguchi et al. | | 711/156 |
| 7,792,882 B2 * | 9/2010 | Moore et al. | | 707/822 |
| 8,006,111 B1 * | 8/2011 | Faibish et al. | | 713/324 |
| 2005/0125411 A1 * | 6/2005 | Kilian et al. | | 707/10 |
| 2005/0273638 A1 * | 12/2005 | Kaiju et al. | | 713/323 |
| 2006/0121954 A1 * | 6/2006 | Mock | | 455/574 |
| 2007/0061512 A1 * | 3/2007 | Taguchi et al. | | 711/114 |
| 2007/0067560 A1 * | 3/2007 | Anzai et al. | | 711/112 |
| 2007/0220293 A1 * | 9/2007 | Takase | | 713/320 |
| 2008/0294920 A1 * | 11/2008 | Hatasaki et al. | | 713/323 |
| 2009/0179754 A1 * | 7/2009 | Burchard et al. | | 340/540 |

\* cited by examiner

*Primary Examiner* — Arpan P. Savla
(74) *Attorney, Agent, or Firm* — Krishnendu Gupta; Robert Kevin Perkins; Joseph D'Angelo

(57) ABSTRACT

Some embodiments of the invention relate to selecting a data protection scheme, such as, for example, mirroring or RAID, for a content unit based on power-related metadata associated with the content unit. The data protection strategy selected for a content unit may impact the amount of power that a storage system consumes.

20 Claims, 3 Drawing Sheets

MANAGING POWER CONSUMPTION OF A STORAGE SYSTEM

FIELD OF INVENTION

The present application relates to management of the power consumption of a storage system.

DESCRIPTION OF THE RELATED ART

A storage system typically comprises a plurality of hardware components, each of which consumes power when operating. For example, a storage system may include one or more microprocessors, cache memory, and storage devices (e.g., magnetic disk drives, optical disk drives, or other types of storage devices).

Storage systems sometimes experience failures. For example, a storage device, such as a disk drive, may malfunction making the data stored therein inaccessible (at least temporarily). In addition, data stored on a storage system may become corrupted.

To protect against data loss as result of data corruption or hardware failure, storage systems frequently use a data protection strategy. One data protection strategy used in some storage systems is mirroring. In a storage system that uses mirroring, a copy of data stored on a storage device is maintained, or mirrored, on one or more other storage devices. Thus, if one copy of the data becomes corrupted or the storage device storing one of the copies malfunctions, the data may be accessed on another storage device.

Another data protection strategy used in some storage systems is a Redundant Array of Independent Disks (RAID). In a storage system employing RAID, data is striped across a plurality of storage devices and an additional storage device stores parity information for the data. Thus, if one of the storage devices fails, the parity information may be used to recover the portion of the data stored on the failed storage device. Likewise, if a portion of the data becomes corrupted, the parity information may be used to correct the data. Other RAID strategies involve rotating the parity information across all storage devices or striping the data across multiple storage devices without storing any parity information.

SUMMARY OF THE INVENTION

One embodiment is directed to a method of managing storage of content units stored on a storage system, the method comprising acts of: storing a content unit on the storage system; storing, on the storage system, metadata related to a limit on an amount of power to be consumed in maintaining the content unit on the storage system; and associating the metadata with the content unit.

Another embodiment is directed to a method of managing storage of a content unit stored on a storage system, the method comprising an act of: selecting a data protection strategy for the content unit based on metadata, associated with the content unit, related to a limit on an amount of power to be consumed by the storage system in maintaining the content unit.

DETAILED DESCRIPTION

Figure 1:
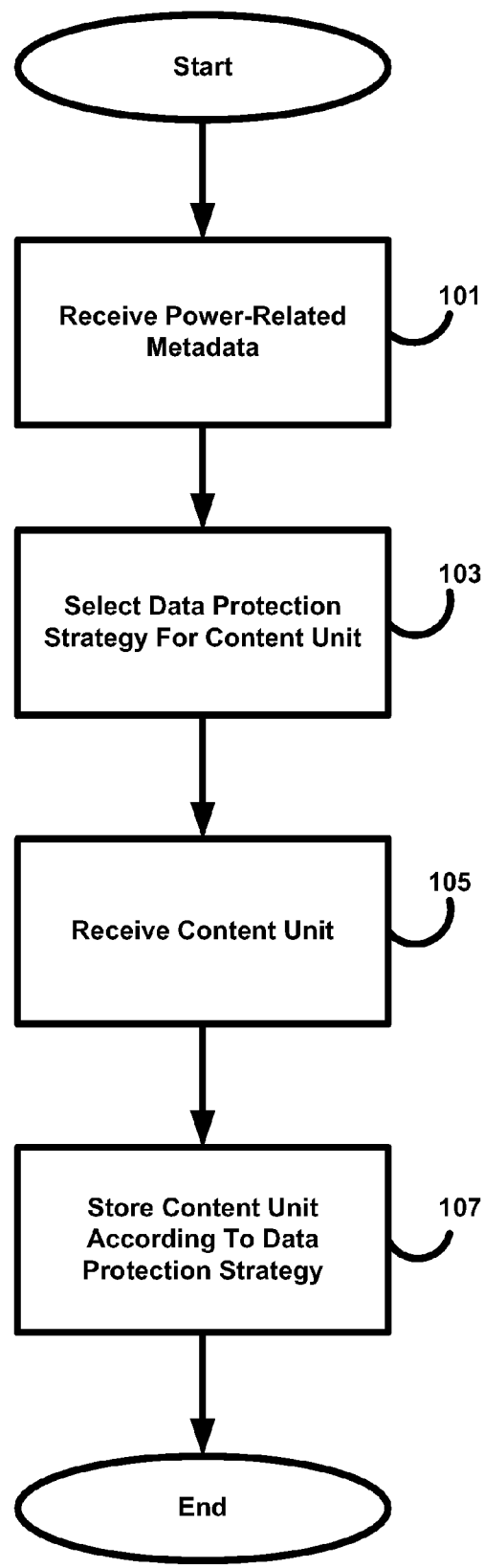
FIG. 1 is a flow chart of a process for selecting a data protection strategy for a content unit, in accordance with some embodiments of the invention.

Applicants have appreciated that the data protection strategy used to protect a content unit may affect the amount of power consumed by the storage system. For example, if a content unit is mirrored on one additional storage device (i.e., in addition to the storage device on which the content unit was originally stored), then two storage devices are kept in a powered-on state to keep the content unit available. If the content unit is mirrored on two additional storage devices, then three storage devices are kept in a powered-on state. If the content unit is protected via RAID (rather than mirroring), the number of storage devices that are kept in powered-on state may be larger. For example, a content unit may be striped across four storage devices, with an additional storage device storing parity information. Thus, five storage devices are kept in a powered-on state to keep the content unit available. In addition, when the content unit is accessed, at least four of these storage devices are used to access the content unit, consuming additional power.

Thus, some embodiments are directed to selecting a data protection strategy for a content unit stored on a storage system based on power-related metadata for the content unit. The power-related metadata for the content unit may include any suitable information related to power consumption as the invention is not limited in this respect.

For example, in some embodiments, the power related metadata for a content unit may specify a "power budget" for the content unit. The power budget may indicate an amount of power that is permitted to be consumed in maintaining the content unit on the storage system. As used herein, the phrase "maintaining a content unit on a storage device" refers to storing the content unit on the storage system and servicing access requests for the content unit from the storage system. In this respect, "maintaining a content unit on a storage device" can be thought of as hosting the content unit on the storage device Alternatively, the power-related metadata may specify a carbon limit (i.e., a maximum amount of carbon to be released into the atmosphere in maintaining the content unit on the storage system). A power limit and carbon limit are just two examples of power-related metadata, and any other metadata related to power consumption in storing a content unit may be used.

A storage system may select a data protection strategy for a content unit in any suitable way, as the invention is not limited in this respect. For example, in some embodiments, if the power-related metadata for a content unit indicates that a relatively small amount of power should be consumed in maintaining the content unit on the storage system, a data protection strategy that consumes less power may be selected, while if the power-related metadata for the content unit indicates that a relatively large amount of power may be consumed in maintaining the content unit on the storage system, a data protection strategy that consumes more power may be selected.

Any suitable data protection strategy may be selected, as the invention is not limited in this respect. For example, in some embodiments, a storage system may determine whether to protect a content unit via mirroring or via RAID. In addition, in some embodiments, if the storage system selects mirroring as the data protection strategy for a content unit, the storage system may select the number of storage devices on which to mirror the content unit.

That is, as the number of storage devices on which a content unit is mirrored increases, so does the amount of power that the storage system consumes, as additional storage devices may be used and powered on to store the content unit. Thus, the storage system may select the number of storage devices on which to mirror the content unit based on the power-related metadata.

In some embodiments, if the storage system selects RAID as the data protection strategy, the storage system may also select the level of RAID to be used in protecting the content unit (i.e., the number of storage devices across which the data is to be striped and the number of storage devices on which to store the parity information). That is, as the number of storage devices used to store the content unit and the parity information increases, so does the amount of power used to maintain the content unit on the storage system because more storage devices are used and remain powered on to store the content unit, and when a request to access a content unit is received, more storage devices are used to access the content unit.

The selected data protection strategy may be implemented in any suitable way, as the invention is not limited in this respect. In some embodiments, the data protection strategy for a content unit may be put in place when a request to store the content unit received. FIG. 1 shows an example of a process by which a data protection strategy may be selected in response to a request to store a content unit. At act 101, the storage system receives, as part of the request to store the content unit, power-related metadata for the content unit. The process then continues to act 103, where the storage system uses the power-related metadata to select a data protection strategy for the content unit. The process the continues to act 105, where the storage system receives, as part of the request to store the content unit, the content of the content unit.

The process then continues to act 107, where the storage system stores the content unit according to the data protection strategy. That is, for example, if a mirroring strategy is selected, then the storage system may store the content unit on a storage device, and may store the appropriate number of mirrored copies on other storage devices. If, for example, a RAID strategy is selected, then the storage system may compute the parity information, stripe the content unit across the appropriate number of disks, and store the appropriate number of copies of the parity information.

In the examples discussed above, a storage system determines a data protection strategy for a content unit based on power-related metadata associated with the content unit. However, the invention is not limited in this respect, as the selection of the power-related metadata may be made by any suitable entity in the computer system. For example, in some embodiments, the data protection strategy for a content unit may be selected by the host computer that initiated the request to store the content unit on the storage system.

Figure 2:
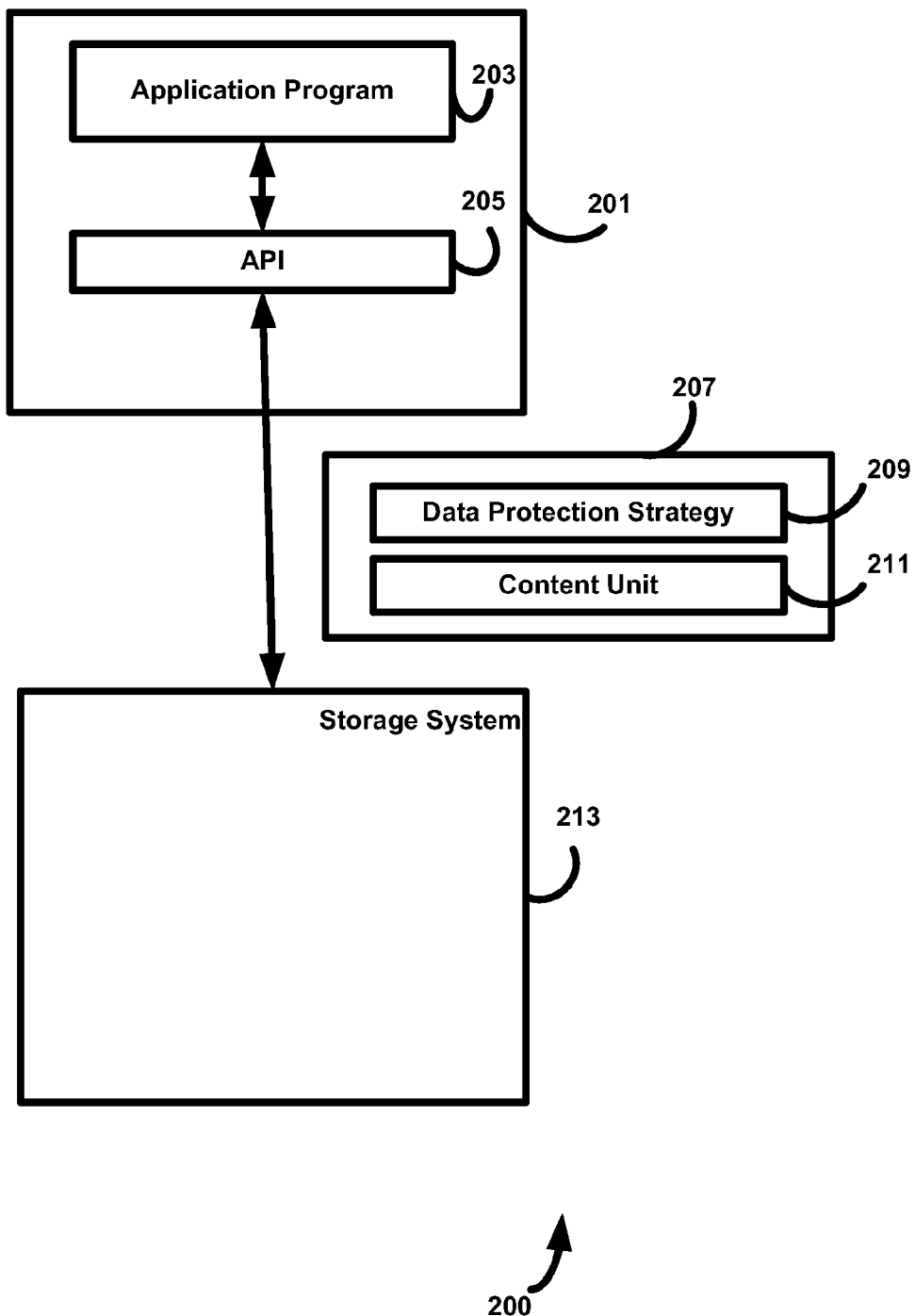
FIG. 2 is a block diagram of a computer system in which an application programming interface (API) may specify a data protection strategy to be applied to a content unit by a storage system, in accordance with some embodiments.

For example, FIG. 2 shows a computer system 200 comprising a host computer 201 that executes an application program 203. The application program communicates with a storage system 213 via an application programming interface (API) 205. An API is an interface that supports requests from application programs. That is, for example, API 205 may provide an interface that the application program uses to communicate with storage system 213. In this way, the application program need not be aware of the details of the protocols used to communicate with the storage system. Moreover, if it is desired to change these protocols, the application program need not be changed.

In some embodiments, API 205 may select a data protection strategy for a content unit. This may be done in any suitable way, as the invention is not limited in this respect. For example, in some embodiments, application program 203 may initiate a request to store a content unit on storage system 213 and may send the content unit to be stored to API 205. API 205 may select, based on power-related metadata associated with the content unit, a data protection strategy for the content unit, and may send a request 207 to storage system 213 to store the content unit. Request 207 may include an indication of the selected data protection strategy 209 and the content unit 211. Storage system 213 may receive request 207, determine the data protection strategy to be applied to the content unit from request 207 and store the content unit according to this data protection strategy.

In the examples discussed above, a data protection strategy is selected in response to a request to store a content unit. However, the invention is not limited in this respect, as the data protection strategy for a content unit may be selected at any suitable time. For example, in some embodiments, the data protection strategy may be selected after the content unit has been stored on the storage system.

That is, for example, data protection may be performed asynchronously. For example, in some embodiments, storage system 213 may execute a utility that runs in the background and determines whether a content unit has been protected. If the content unit has not been protected, the utility may select a data protection strategy for the content unit based on power-related metadata and implement the data protection strategy (e.g., by creating one or more additional copies of the content unit on other storage devices in the case of mirroring, or by striping the content unit across multiple storage devices and storing the parity information, in the case of RAID).

In the examples above, the data protection strategy for a content unit is implemented on a storage system on which the content unit is ultimately stored. Any suitable type of storage system may be used as the invention is not limited in this respect. For example, in some embodiments, a block I/O storage system may be used. A block I/O storage system is a storage system that requires that the access requests identify units of data to be accessed using logical volume and block addresses that define where the units of data are stored on the storage system. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In some embodiments, an object addressable storage (OAS) system may be used. An OAS system is a storage system that receives and processes access requests that identify a data unit or other content unit (also referenced to as an object) using an object identifier, rather than an address that specifies where the data unit is physically or logically stored in the storage system. In object addressable storage, a content unit may be identified (e.g., by host computers requesting access to the content unit) using its object identifier and the object identifier may be independent of both the physical and logical location(s) at which the content unit is stored (although it is not required to be because in some embodiments OAS systems may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system that may be used in some embodiments of the invention is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

In the examples above, a data protection strategy for a content unit is selected based on power-related metadata for the content unit. This metadata may be generated in any suitable way, as the invention is not limited in this respect. For example, in some embodiments, the power-related metadata may be generated by an application program that initiates the request to store a content unit.

Alternatively, in some embodiments, the power-related metadata may be generated by an application programming interface. This may be done in any suitable way, as the invention is not limited in this respect. For example, in FIG. 2, when API 205 receives an indication from application program 203 to store a content unit, it may generate power-related metadata for the content unit.

The power-related metadata may be generated based on any suitable criterion or criteria. For example, API 205 may generate power-related metadata based on the type of content in the content unit, the size of the content unit, the name or type of the application program that initiated the request to store the content unit, any suitable combination of these criteria, and/or any other suitable criterion or criteria.

In some embodiments, the storage system on which a content unit is to be stored may generate power-related metadata for a content unit. This may be done in any suitable way, as the invention is not limited in this respect. For example, the storage system may generate power-related metadata for a content unit when a request to store the content unit is received or after the content unit has been stored on the storage system. The power-related metadata may be generated based on any suitable criterion or criteria, including any of the criteria discussed above or any other suitable criteria.

Power-related metadata may be associated with a content unit in any suitable way, as the invention is not limited in this respect. For example, in some embodiments, the storage system may store power-related metadata that applies to every content unit stored on the storage system.

Alternatively, in some embodiments, the storage system may store power-related metadata that applies to groups of content units stored on the storage. Thus, for example, different power-related metadata may apply to different groups of content units. This may be accomplished in any suitable way, as the invention is not limited in this respect.

For example, in some embodiments, power-related metadata may be applied to a particular group of content using virtual pools. A virtual pool is a logical grouping of content units. For example, one virtual pool on a storage system may include content units that store e-mails, while another virtual pool may include content units that store mortgage applications. For example, content units for which it is desired to apply one set of power-related metadata may be grouped into one virtual pool, while content units for which it is desired to apply a different set of power-related metadata may be grouped into another virtual pool.

In such embodiments, when selecting a data protection policy for a content unit, the storage system may determine in which virtual pool a content unit is stored, determine the power-related metadata for that virtual pool, and use the power-related metadata in selecting a data protection policy for a content unit.

In some embodiments, power-related metadata may be associated with individual content units, such that an individual content unit may have its own power-related metadata. This may be done in any suitable way, as the invention is not limited in this respect.

For example, in some embodiments in which the content unit is stored on an OAS system, a CDF/blob architecture may be used. In a CDF/blob architecture, content can be stored in a blob and have an object identifier (e.g., a content address) associated with it, and a content descriptor file (CDF) created for the blob can include the object identifier for the blob as well as metadata associated with it. The CDF is independently accessible via its own object identifier. By accessing the CDF, the content in the blob can be efficiently and easily accessed (via its object identifier that is included in the CDF) along with its associated metadata.

Figure 3:
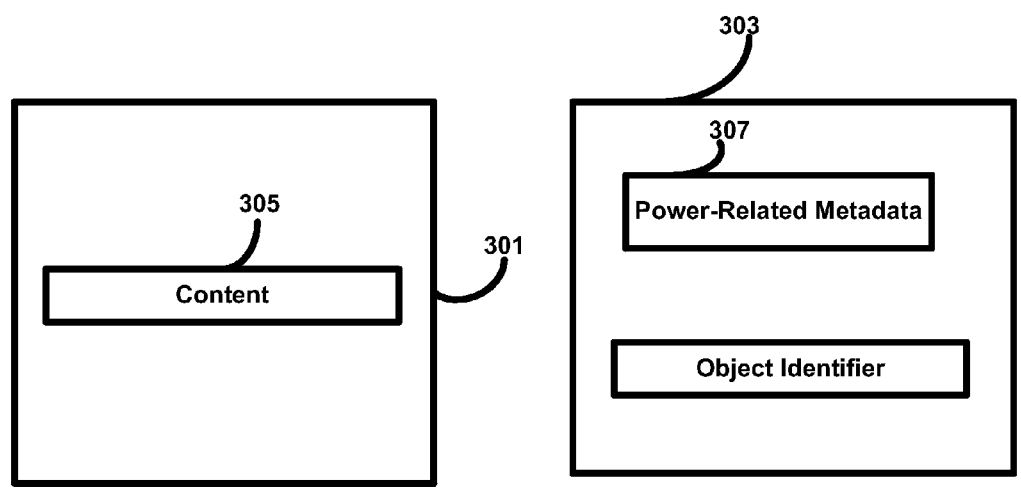
FIG. 3 is a block diagram of power-related metadata associated with a content unit using a blob/content descriptor file (CDF)/blob architecture, in accordance with some embodiments.

Thus, in some embodiments of the invention, content may be stored in a blob and power-related metadata for the content may be stored in a CDF associated with the blob. For example, as shown in FIG. 3, a blob 301 stored on an OAS system stores content 305. Blob 301 is identifiable on the OAS system by an object identifier. If the OAS system is a CAS system, the object identifier for blob 301 may be a content address. CDF 303 stores power-related metadata 307 for blob 301 and also includes the object identifier for blob 301, which servers as a pointer to blob 301. CDF 303 is also identifiable on the OAS system by its own object identifier, which is separate from the object identifier used to identify blob 301.

In the example of FIG. 3, the only metadata in CDF 303 is power-related metadata. However, the invention is not limited in this respect, Any other suitable information (i.e., in addition to the power-related metadata) may be stored in the CDF, as the invention is not limited in this respect.

Another example of a technique for associating metadata with content in an object addressable system is the eXtensible Access Method (XAM) proposal that is being developed jointly by members of the storage industry and is proposed as a standard. In accordance with XAM, an "XSET" can be defined to include one or more pieces of content and metadata associated with the content, and the XSET can be accessed using a single object identifier (referred to as an XUID). Thus, for example, a content unit and its associated power-related metadata may be grouped together in an XSET, along with any other suitable metadata.

Again, it should be appreciated that the CDF/blob and XSET techniques for associating metadata with content are merely two examples of ways in which content can be associated with metadata, and that the aspects of the present invention described herein are not limited to use in a system that employs one of these or any other particular technique for associating metadata with content.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art.

Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of managing storage of content units stored on an object addressable storage (OAS) system, the method comprising acts of:
    receiving a request to store a content unit, the request comprising metadata that directly specifies an amount of power that is a limit on the amount of power to be consumed in maintaining the content unit on the storage system;
    storing the content unit on the storage system;
    associating the content unit with an object identifier that identifies the content unit on the OAS system, wherein the object identifier is generated independent of the storage location of the content unit on the OAS system;
    storing, on the storage system, the metadata; and
    associating the metadata with the content unit.

2. The method of claim 1, wherein the content unit is a first content unit, wherein the object identifier is a first object identifier, and wherein the act of associating the metadata with the content unit further comprises an act of storing a second content unit on the OAS system that includes the metadata and the first object identifier, wherein the second content unit is identifiable on the OAS system via a second object identifier.

3. The method of claim 1, wherein the OAS system comprises a content addressable storage (CAS) system, and wherein the object identifier for the content unit is a content address that is generated, at least in part, by hashing at least a portion of the content of the content unit.

4. The method of claim 1, wherein the limit on the amount of power is specified as a maximum amount of carbon to be released into the atmosphere as a result of maintaining the content unit on the storage system.

5. The method of claim 1, wherein the OAS system is configured to, in response to a receipt of a request to access the content unit that identifies the content unit by the object identifier, returns the content unit in response to the request.

6. The method of claim 1, wherein:
    the request to store the content unit is received from a host computer; and
    the metadata is generated by an application programming interface (API) of the host computer.

7. The method of claim 1, wherein:
an API generates the metadata based on one or more criterion received from an application program of the host computer.

8. At least one non-transitory computer readable storage medium encoded with instructions that, when executed, perform a method of managing storage of content units stored on an object addressable storage (OAS) system, the method comprising acts of:
receiving a request to store a content unit, the request comprising metadata that directly specifies an amount of power that is a limit on the amount of power to be consumed in maintaining the content unit on the storage system;
storing the content unit on the storage system;
associating the content unit with an object identifier that identifies the content unit on the OAS system, wherein the object identifier is generated independent of the storage location of the content unit on the OAS system;
storing, on the storage system, metadata; and
associating the metadata with the content unit.

9. The at least one non-transitory computer readable storage medium of claim 8, wherein the content unit is a first content unit, wherein the object identifier is a first object identifier, and wherein the act of associating the metadata with the content unit further comprises an act of storing a second content unit on the OAS system that includes the metadata and the first object identifier, wherein the second content unit is identifiable on the OAS system via a second object identifier.

10. The at least one nontransitory computer readable storage medium of claim 8, wherein the OAS system comprises a content addressable storage (CAS) system, and wherein the object identifier for the content unit is a content address that is generated, at least in part, by hashing at least a portion of the content of the content unit.

11. The at least one non-transitory computer readable storage medium of claim 8, wherein the limit on the amount of power is specified as a maximum amount of carbon to be released into the atmosphere as a result of maintaining the content unit on the storage system.

12. The at least one non-transitory computer readable storage medium of claim 8, wherein the OAS system is configured to, in response to a receipt of a request to access the content unit that identifies the content unit by the object identifier, returns the content unit in response to the request.

13. The at least one non-transitory computer readable storage medium of claim 8, wherein:
the request to store the content unit is received from a host computer; and
the metadata is generated by an application programming interface (API) of the host computer.

14. The at least one non-transitory computer readable storage medium of claim 8, wherein:
an API generates the metadata based on one or more criterion received from an application program of the host computer.

15. An object addressable storage (OAS) system comprising:
at least one storage device; and
at least one controller, coupled to the at least one storage device that:
receiving a request to store a content unit, the request comprising metadata that directly specifies an amount of power that is a limit on the amount of power to be consumed in maintaining the content unit on the storage system;
stores the content unit on the at least one storage device;
associates the content unit with an object identifier that identifies the content unit on the OAS system, wherein the object identifier is generated independent of the storage location of the content unit on the OAS system;
stores, on the at least one storage device, metadata; and
associates the metadata with the content unit.

16. The OAS system of claim 15, wherein the content unit is a first content unit, wherein the object identifier is a first object identifier, and wherein the act of associating the metadata with the content unit further comprises an act of storing a second content unit on the OAS system that includes the metadata and the first object identifier, wherein the second content unit is identifiable on the OAS system via a second object identifier.

17. The OAS system of claim 15, wherein the OAS system is a content addressable storage (CAS) system, and wherein the object identifier for the content unit is a content address that is generated, at least in part, by hashing at least a portion of the content of the content unit.

18. The OAS system of claim 15, wherein the OAS system is configured to, in response to a receipt of a request to access the content unit that identifies the content unit by the object identifier, returns the content unit in response to the request.

19. The OAS system of claim 15, wherein:
the request to store the content unit is received from a host computer; and
the metadata is generated by an application programming interface (API) of the host computer.

20. The OAS system of claim 15, wherein:
an API generates the metadata based on one or more criterion received from an application program of the host computer.

* * * * *